US010023293B2

(12) United States Patent
Gaitonde et al.

(10) Patent No.: US 10,023,293 B2
(45) Date of Patent: Jul. 17, 2018

(54) STIFFENER RUN-OUT

(75) Inventors: Martin Gaitonde, Bristol (GB); Enzo Cosentino, Bristol (GB)

(73) Assignee: Airbus Operations Limited, Bristol (GB)

( * ) Notice: Subject to any disclaimer, the term of this patent is extended or adjusted under 35 U.S.C. 154(b) by 846 days.

(21) Appl. No.: 13/820,619

(22) PCT Filed: Sep. 22, 2011

(86) PCT No.: PCT/GB2011/051795
§ 371 (c)(1),
(2), (4) Date: Mar. 4, 2013

(87) PCT Pub. No.: WO2012/042246
PCT Pub. Date: Apr. 5, 2012

(65) Prior Publication Data
US 2013/0164489 A1    Jun. 27, 2013

(30) Foreign Application Priority Data

Sep. 28, 2010   (GB) .................................. 1016279.0

(51) Int. Cl.
*B64C 3/26* (2006.01)
*B64C 1/06* (2006.01)
*B23P 19/00* (2006.01)
*B64C 3/18* (2006.01)

(52) U.S. Cl.
CPC ................ *B64C 3/26* (2013.01); *B23P 19/00* (2013.01); *B64C 1/06* (2013.01); *B64C 1/064* (2013.01); *B64C 3/182* (2013.01); *Y10T 29/49616* (2015.01); *Y10T 428/24008* (2015.01); *Y10T 428/24174* (2015.01)

(58) Field of Classification Search
CPC .......... B64C 3/182; B64C 3/26; B64C 1/064; B64C 1/06; B23P 19/00
USPC ............................ 428/99, 119, 156; 29/897; 244/117 R–136
See application file for complete search history.

(56) References Cited

U.S. PATENT DOCUMENTS

| 3,830,581 A | 8/1974 | Furlong |
| 4,507,011 A | 3/1985 | Brown |
| 7,682,682 B2 | 3/2010 | Leon-Dufour et al. |
| 8,652,606 B2 | 2/2014 | Griess et al. |

(Continued)

FOREIGN PATENT DOCUMENTS

| DE | 10 2008 041 172 | 3/2010 |
| EP |      0103518    | 3/1984 |

(Continued)

OTHER PUBLICATIONS

International Search Report for PCT/GB2011/051795, dated Apr. 27, 2012.

(Continued)

*Primary Examiner* — Brian Handville
(74) *Attorney, Agent, or Firm* — Nixon & Vanderhye P.C.

(57) ABSTRACT

A panel assembly comprising: a panel (11); a stiffener (12) having a foot (12*a*), an upstanding web (12*b*) and a run-out region at one end; and a fitting (13), wherein the stiffener foot is bonded to the panel, and wherein the fitting is attached to the stiffener web and to the panel outboard of the end of the stiffener foot. The outboard end of the web may overhang an outboard end of the foot in the run-out region, of the stiffener.

24 Claims, 4 Drawing Sheets

(56) References Cited

U.S. PATENT DOCUMENTS

| | | |
|---|---|---|
| 2005/0211846 A1 | 9/2005 | Leon-Dufour et al. |
| 2008/0258008 A1 | 10/2008 | Cooper |
| 2008/0292849 A1 | 11/2008 | Stephan |
| 2009/0084899 A1* | 4/2009 | Kismarton ............... B64C 1/26 244/123.1 |
| 2009/0317587 A1* | 12/2009 | Deobald et al. ............. 428/119 |
| 2011/0164918 A1 | 7/2011 | Cosentino |
| 2012/0045606 A1 | 2/2012 | Griess et al. |
| 2012/0056037 A1* | 3/2012 | Dolzinski et al. ............ 244/119 |
| 2012/0234978 A1 | 9/2012 | Hernando Navas et al. |
| 2013/0075526 A1 | 3/2013 | Griess et al. |

FOREIGN PATENT DOCUMENTS

| | | |
|---|---|---|
| GB | 2072579 | 10/1981 |
| WO | WO 2008/132498 | 11/2008 |
| WO | 2008/145527 | 12/2008 |
| WO | WO 2009000734 A2 * | 12/2008 |
| WO | WO 2009/050357 | 4/2009 |
| WO | 2009/103635 | 8/2009 |
| WO | WO 2009/109438 | 9/2009 |
| WO | WO 2009/146958 | 12/2009 |
| WO | WO 2010/046684 | 4/2010 |
| WO | WO 2010/106040 | 9/2010 |

OTHER PUBLICATIONS

Written Opinion of the International Searching Authority for PCT/GB2011/051795, dated Apr. 27, 2012.

UK Search Report for GB Application No. 1016279.0, dated Jan. 26, 2011.

UK Search Report for GB Application No. 1209439.7, dated Aug. 16, 2012, 1 page.

* cited by examiner

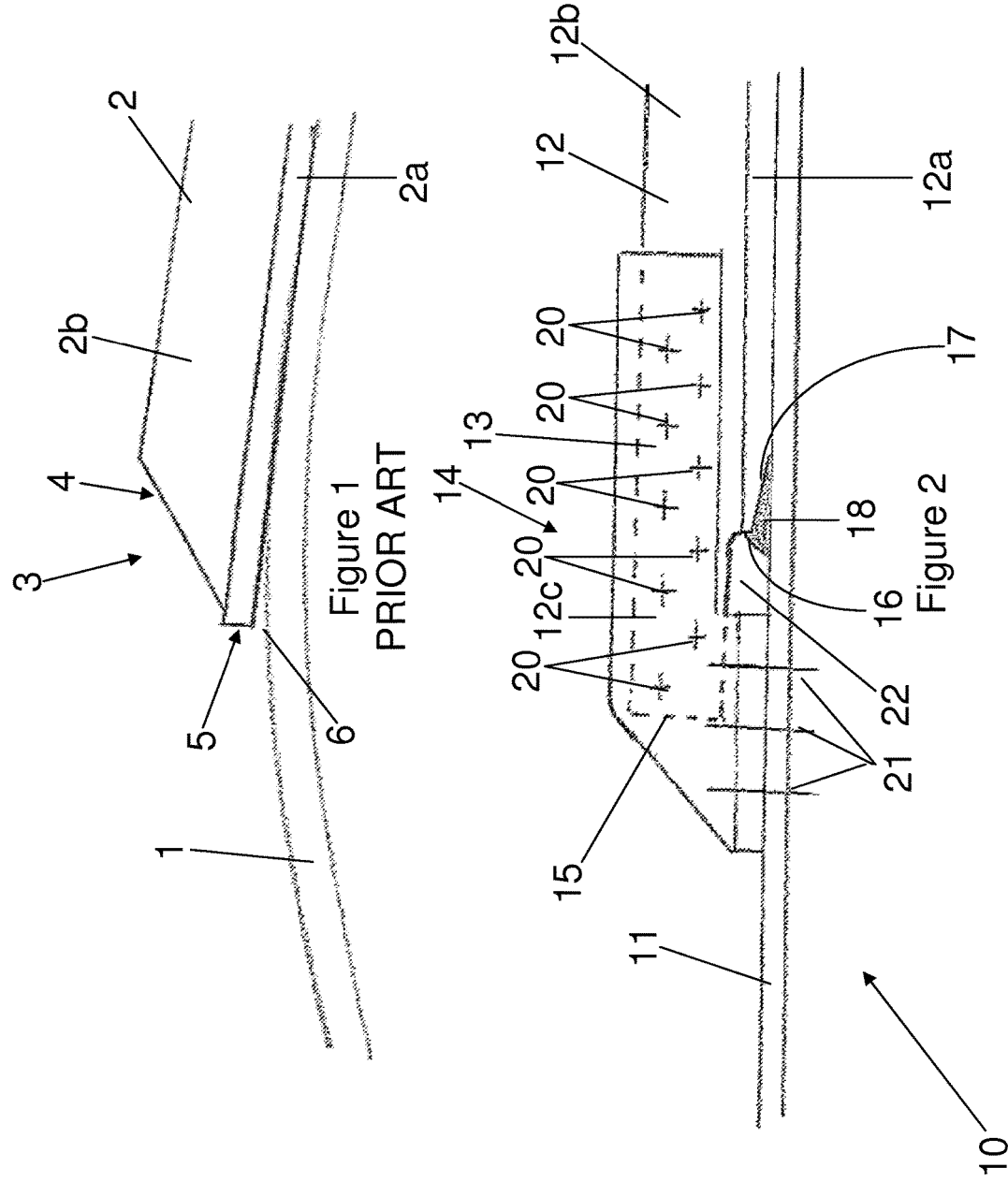

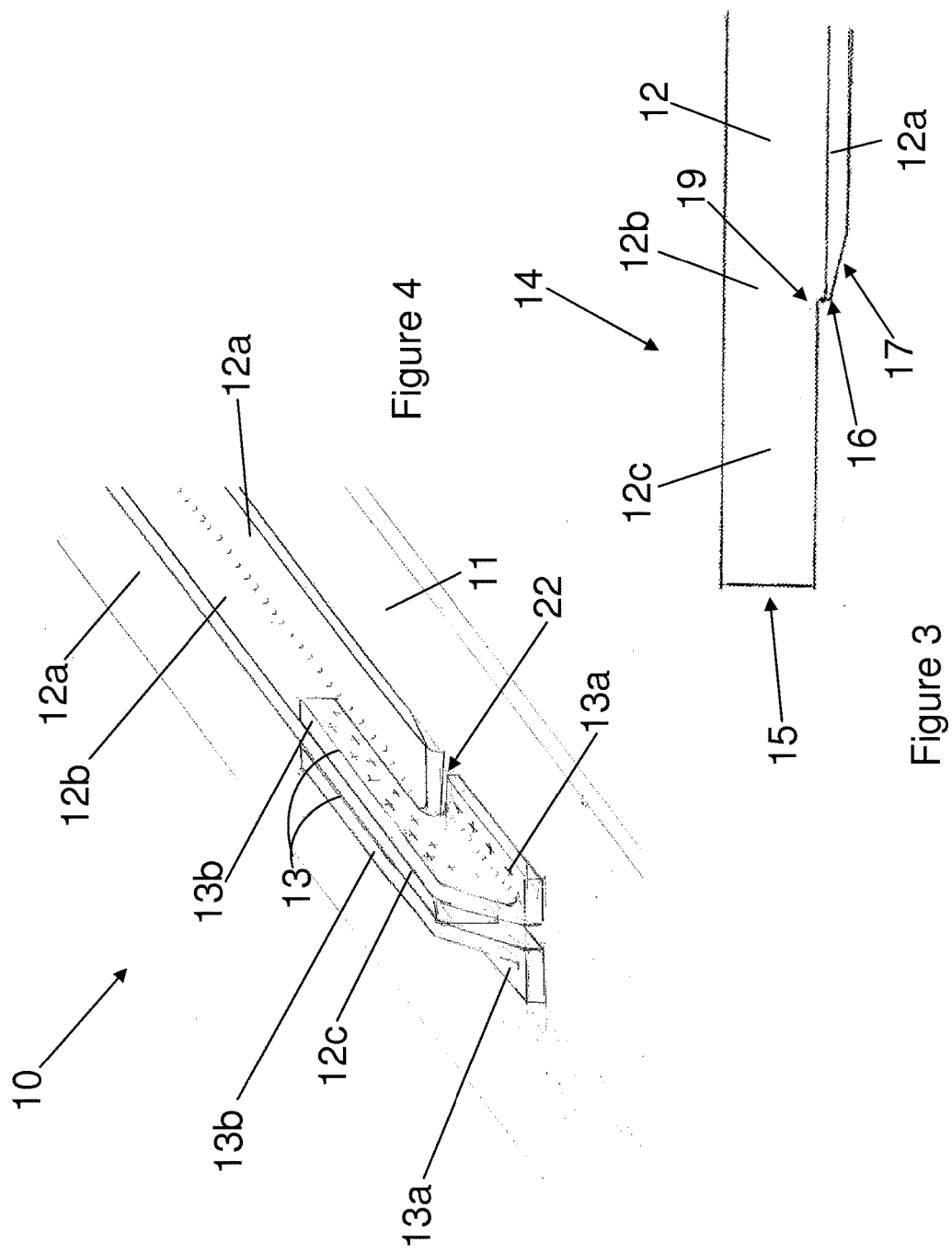

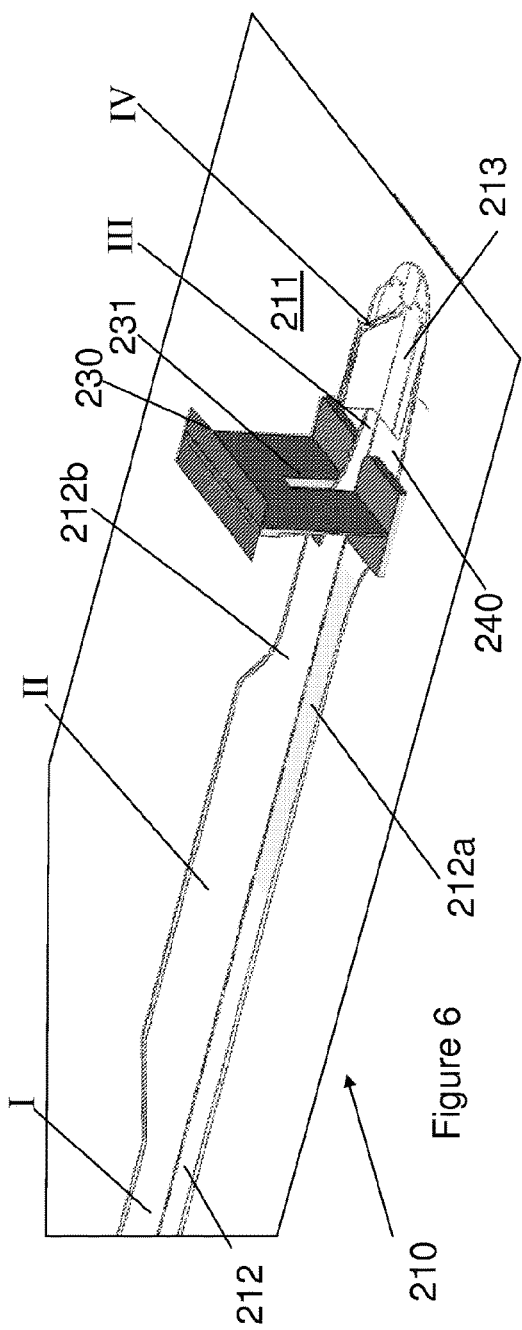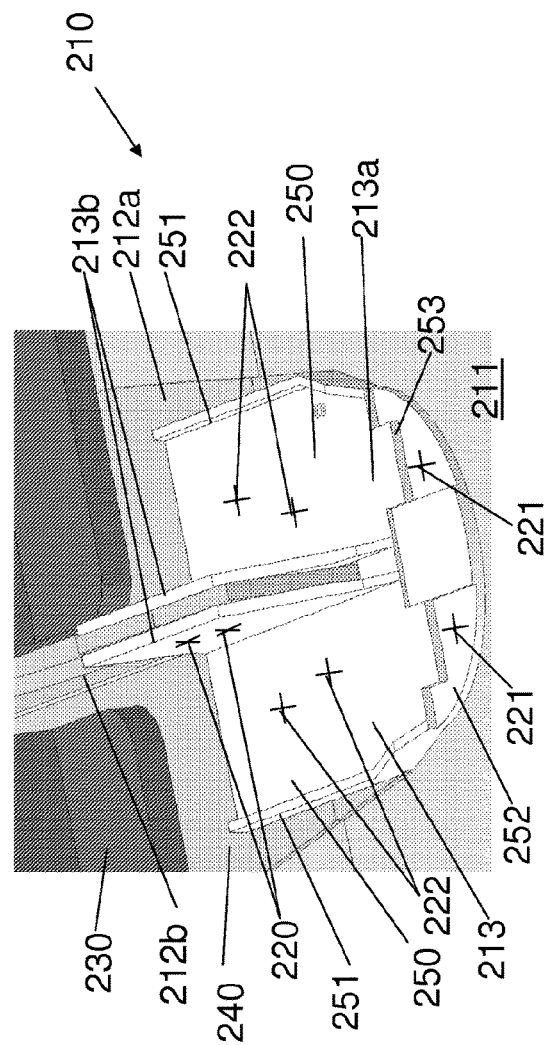
Figure 6
Figure 7

STIFFENER RUN-OUT

This application is the U.S. national phase of International Application No. PCT/GB2011/051795, filed 22 Sep. 2011, which designated the U.S. and claims priority to GB Application No. 1016279.0, filed 28 Sep. 2010, the entire contents of each of which are hereby incorporated by reference.

FIELD OF THE INVENTION

The present invention relates to a stiffener having a run-out region; a panel assembly including a stiffener reinforced panel; a kit of parts for forming a stiffener reinforced panel; and a method of forming a stiffener reinforced panel.

BACKGROUND OF THE INVENTION

A thin-walled panel may be stiffened by attachment of a plurality of stiffeners, which divide the panel into a plurality of smaller and more stable sub-panels. Stiffener reinforced panels are encountered in many weight optimised structures, such as aircraft structures. For example, an aircraft wing box typically includes upper and lower covers, which comprise a skin (panel) stiffened with reinforcing longitudinal stringers (stiffeners).

Stiffeners have to be terminated in certain areas due to conflict with other structural components. In the case of an aircraft wing box, the stiffeners typically have to be terminated at, e.g. the wing root, the wing tip, access holes etc. At the stiffener termination, stress supported by the stiffener is transferred into the panel. Stiffener terminations are therefore often responsible for areas of local stress concentration. To reduce the stress concentration, stiffeners are typically designed to have a, so called, "run-out" region at the termination to transition the load from the stiffener into the panel in such a way as to minimise stress peaks.

With the move to greater use of composite materials, such as carbon fibre-reinforced plastic (CFRP), in weight optimised structures the structural performance at the stiffener run-out is of particular interest.

For a composite aircraft wing box cover, the stringers are typically bonded (co-cured, co-bonded, or secondary bonded) to the skin. The stringer run-outs can suffer cracking when loaded due to the natural offset between the stringer and the skin. The offset causes out of plane bending, which results in tensile through-thickness loads that can cause peeling at the (tip) end of the stringer foot run-out where it attaches to the skin.

This problem has traditionally been solved by ensuring low deformation (low strain) in the structure under load. A solution which enables the structure to work at higher strains without issue would enable weight saving. U.S. 2005/0211846 A1 describes a stringer run-out having a gradual reduction in the stringer height at the run out, and WO 2008/132498 A1 describes fastening a stringer run-out to a panel to enhance performance.

SUMMARY OF THE INVENTION

A first aspect of the invention provides a panel assembly comprising: a panel; a stiffener having a foot, an upstanding web and a run-out region at one end; and a fitting, wherein the stiffener foot is bonded to the panel, and wherein the fitting is attached to the stiffener web and to the panel outboard of the end of the stiffener foot.

A further aspect of the invention provides a method of forming a stiffener reinforced panel, the method comprising: providing a stiffener having a foot, an upstanding web and a run-out region at one end; bonding the stiffener foot to a panel; and attaching a fitting to the stiffener web and attaching the fitting to the panel outboard of the end of the stiffener foot.

A yet further aspect of the invention provides a kit of parts for forming a stiffener reinforced panel, the kit comprising: a stiffener having a foot, an upstanding web and a run-out region at one end; a panel; and a fitting for attachment to the stiffener web and for attachment to the panel outboard of the end of the stiffener foot.

The invention is advantageous in that the fitting may have sufficient bending stiffness to minimise bending of the panel local to the stiffener foot at the run-out, which reduces the peeling force at the end of the stiffener foot and so enhances the strength in terms of the load required for crack initiation at the end of the stiffener foot. Although the bending of the panel is transferred further outboard to the outboard end of the fitting, the fitting may be fastened, and not bonded, to the panel and so there can be sufficient strength in the fasteners to resist the resulting through thickness loading.

A yet further aspect of the invention provides a stiffener comprising a foot and an upstanding web and having a run-out region at one end, wherein an outboard end of the web overhangs an outboard end of the foot in the run-out region.

The invention is advantageous in that the overhanging portion of the web may be used to secure the web outboard of the end of the stringer foot.

A stiffener for a stiffener reinforced panel is a longitudinal member.

The stiffener having the overhanging web may be used in the panel assembly according to the first aspect of the invention.

The fitting may be attached to the stiffener web. In the case that the fitting has an overhanging web part then the fitting is preferably attached to at least the overhanging web part. More preferably, the fitting is attached to both the overhanging web part and the web inboard of the run-out.

The fitting may be fastened to the stiffener web and/or to the panel. For example, the fitting may be bolted.

The fitting may be fastened directly to the stiffener web and/or to the panel.

The fitting is preferably not directly bonded to the panel.

The fitting may be arranged to provide a gap between the end of the stiffener foot and the fitting. The gap dimensions are preferably relatively small. When a tensile load is applied to the panel assembly in the longitudinal stiffener direction, the small gap may cause the panel to bend inwards giving rise to a beneficial negative peeling at the stiffener foot run-out.

The fitting may be formed as a "shoe" having a foot and an upstanding web.

The fitting may be formed in two parts, one part being attached on either side of the stiffener web. Alternatively, the fitting may be formed as a unitary part.

The stiffener foot may be bonded to the panel by one selected from the group comprising: co-curing, co-bonding, or secondary bonding. In addition, the outboard end of the stiffener foot may be fastened to the panel.

The fitting may have sufficient bending stiffness to prevent bending of the panel local to the end of the stiffener foot.

The end of the stiffener foot may have a back chamfer. The back chamfer may have a surface facing outboard and towards the panel. A resin fillet may be provided between the back chamfer and the panel. The resin fillet may substantially fill the void between the back chamfer and the panel, and may further feature a round at the outboard end of the fillet. The back chamfer may enhance the strength of the panel to stiffener joint at the outboard end of the foot.

The stiffener may have a T-section. Alternatively, the stiffener may have an I-section, an L-section, a U-section, or any other suitable section.

The stiffener may have a fillet at the intersection between the stiffener web and the end of the stiffener foot. The fillet helps reduce stress concentrations.

The panel assembly may include a plurality of the stiffeners.

The stiffener may be a stringer, or longeron, for example.

The fitting may include a finger plate extending over a portion of the stiffener foot. The finger plate may have an upstanding flange. The flange may be provided at lateral edge(s) of the finger plate. The finger plate may be fastened through the stiffener foot to the panel.

The panel assembly, or stiffener, may be employed in an aerospace application. For example, the stiffener may be used to reinforce an aircraft fuselage skin (panel) or a wing box cover (panel).

The stiffener is preferably formed of composite material. The composite material may include fibre-reinforced plastic, such as carbon fibre-reinforced plastic, for example.

The composite material may have a laminate construction including a stack of laminate plies.

The fitting may also be formed of composite material, which may be the same or different to that of the stiffener. Alternatively, the fitting may be metallic and may be made of Aluminium or Titanium, for example.

The panel may also be formed of composite material, which may be the same or different to that of the stiffener.

BRIEF DESCRIPTION OF THE DRAWINGS

Embodiments of the invention will now be described with reference to the accompanying drawings, in which:

FIG. 1 illustrates a side view of a conventional stiffener reinforced panel under tensile load, showing a typical crack initiation site at the outboard end of the stiffener foot;

FIG. 2 illustrates a side view of a stiffener reinforced panel assembly according to an embodiment of this invention, including a fitting that attaches an overhanging part of the stiffener web to the panel outboard of the end of the stiffener foot;

FIG. 3 illustrates a side view of the stiffener in isolation, showing the back chamfer in detail;

FIG. 4 illustrates a three-dimensional view of the panel assembly of FIG. 2;

FIGS. 6 and 7 illustrate a stiffener reinforced panel assembly according to a yet further embodiment of this invention, in which the stiffener web has no overhang and the fitting has a unitary construction incorporating finger plates with upstanding edge flanges.

DETAILED DESCRIPTION OF EMBODIMENT(S)

Figure 5:
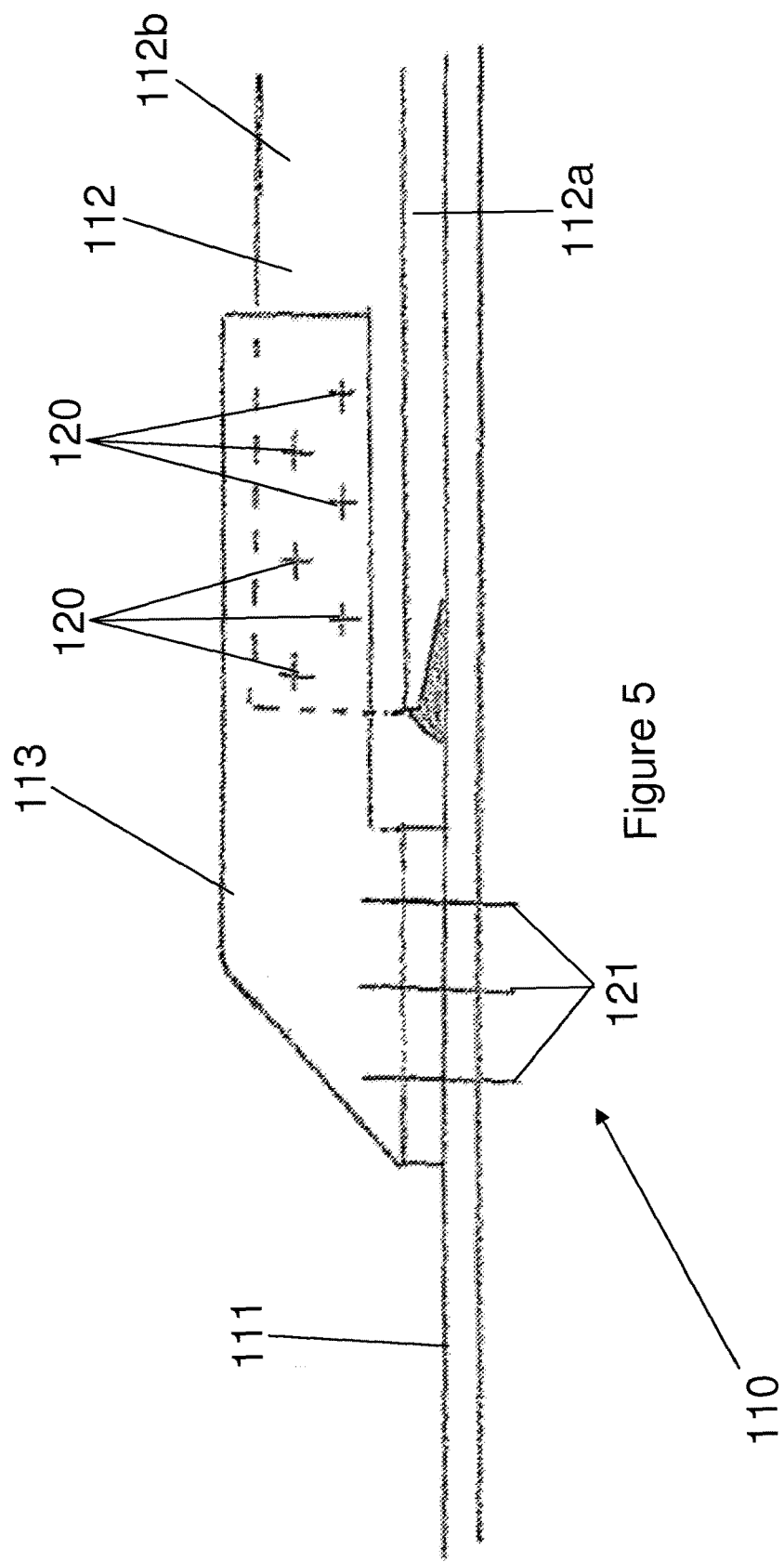
FIG. 5 illustrates a side view of a stiffener reinforced panel assembly according to another embodiment of this invention, in which the stiffener web has no overhanging part.

FIG. 1 illustrates a conventional stiffener reinforced panel. In this example, the panel 1 is a skin of an aircraft wingbox, and the stiffener 2 is a reinforcing longitudinal stringer. The stiffener 2 has an inverted "T" shape cross section so as to form a foot 2a and an upstanding web 2b.

The stiffener 2 has a run-out region 3 at one end. In this example, the run-out region features a taper 4 of reducing web height towards the outboard end 5 of the stiffener foot 2a. FIG. 1 illustrates a side view of the stiffener reinforced panel under tensile load (exaggerated) applied in the longitudinal direction of the stiffener and shows a typical crack initiation site 6 at the outboard end 5 of the stiffener foot 2a.

FIG. 2 illustrates a stiffener reinforced panel assembly 10 according to an embodiment of this invention. The assembly 10 includes a panel 11, a stiffener 12 and a fitting 13. In this example, the panel 11 is a skin of an aircraft wingbox and the stiffener 12 is a reinforcing longitudinal stringer. In the aircraft wingbox the stringers extend substantially spanwise, and the fitting 13 is attached to the outboard (tip) end of the stiffener 12.

The panel 11 and the stiffener 12 are each formed of composite material. The composite material may include fibre reinforced plastic, such as carbon fibre reinforced plastic, for example. The composite material may have a laminate construction including a stack of laminate plies.

The stiffener 12 has a generally inverted "T" shape cross section so as to define a stiffener foot 12a, and an upstanding stiffener web 12b. The stiffener foot 12a is bonded to the inner surface of the panel 11. The stiffener foot may be bonded to the panel by co-curing, co-bonding, or secondary bonding. The stiffener 12 has a run-out region at its outboard end 14, where load is transferred from the stiffener into the panel. The stiffener web 12b has an outboard end 15 which overhangs an outboard end 16 of the stiffener foot 12a in the run-out region so as to define an overhanging part 12c of the stiffener web 12b.

The outboard end 16 of the stiffener foot 12a has a back chamfer 17. The back chamfer 17 has a surface facing outboard and towards the panel 11. A resin fillet 18 is provided between the back chamfer 17 and the panel 11. The resin fillet 18 substantially fills the void between the back chamfer 17 and the panel 11, and further features a round at the outboard end of the fillet. The back chamfer enhances the strength of the panel to stiffener joint at the outboard end 16 of the stiffener foot 12a.

FIG. 3 illustrates the outboard end 14 of the stiffener 12 in isolation. The stiffener 12 has a fillet 19 at the intersection between the stiffener web 12b and the end of the stiffener foot 12a. The fillet 19 helps reduce stress concentrations.

Returning to FIG. 2, the fitting 13 is attached to the stiffener web 12b, and in particular is attached to both the overhanging part 12c of the stiffener web, and a portion of the stiffener web 12b inboard of the overhanging part 12c. As best shown in FIG. 4, the fitting 13 has a two-part construction so as to "sandwich" the stiffener web 12b. The two-part fitting 13 is formed as a "shoe" having a foot 13a and an upstanding web 13b.

The fitting web 13b is fastened to the stiffener web 12b at fastener locations 20. The fasteners may be, for example, bolts or any other suitable fastener as known in the art. The fitting foot 13a is fastened to the panel 11 outboard of the end 16 of the stiffener foot 12a, at fastener locations 21. The fasteners may be, for example, bolts or any other suitable fasteners as known in the art.

The fitting foot 13a is not directly bonded to the panel 11. In other words, there is normally no adhesive bond between the surface of the panel 11 and the underside of the fitting foot 13a. This helps to ensure that the crack initiation site 6 identified in the prior art and shown in FIG. 1 is not simply transferred further outboard to the end of the fitting foot 13a when the fitting 13 is employed.

The fitting 13 is arranged to provide a gap 22 between the outboard end 16 of the stiffener foot 12a and the fitting foot 13a. The gap dimensions are relatively small in comparison with the dimensions of the fitting foot 13a. When a tensile load is applied to the panel assembly 10 in the longitudinal stiffener direction, the gap 22 causes the panel 11 to bend towards the stiffener 12, giving rise to a beneficial negative peeling at the outboard end 16 of the stiffener foot 12a. This contrasts with the positive peeling forces generated between the panel 1 and stiffener 2 under similar tensile loading conditions, as shown in FIG. 1. Therefore the panel assembly 10 shown in FIGS. 2 and 3 significantly reduces the possibility of crack initiation at the stiffener run-out region.

The fitting 13 has sufficient bending stiffness to minimise bending of the panel local to the stiffener foot 12a at the run-out region, which reduces the peeling force at the outboard end 16 of the stiffener foot 12a and so enhances the strength in terms of the load required for crack initiation at the outboard end of the stiffener foot. Although the bending of the panel 11 is transferred further outboard to the outboard end of the fitting 13, since the fitting 14 is fastened, and not bonded, to the panel 11 the fasteners 21 have sufficient strength to resist the resultant loading in the panel through thickness direction.

FIG. 5 illustrates an alternative embodiment and shows a panel assembly 110 including a panel 111, a stiffener 112 and a fitting 113. The panel assembly 110 is similar in many respects to the panel assembly 10 described above and only the differences between the panel assembly 110 and the panel assembly 10 will be described in the following. Most notably, the stiffener 112 has a web 112b and a foot 112a, wherein the web 112b does not overhang the outboard end of the foot 112a. The fitting 113 is fastened to the stiffener web 112b by fasteners 120 and also to the panel 111 by fasteners 121. In all other respects, the panel assembly 110 is similar to the panel assembly 10 described previously. Due to the reduced number of fasteners 120 between the stiffener web 112b and the fitting 113 the fitting has a higher strength than the fitting 13 to withstand the higher bending load that needs to be supported by the fitting web. The fitting 113 will therefore generally be a higher weight option compared to the fitting 13.

In either of the embodiments described above, the fitting may be formed as a unitary part, perhaps having a bifurcated web portion so as to sandwich either side of the stiffener web.

Whilst in the embodiments described above the stiffener is shown having a "T" section, it will be appreciated that the stiffener may have a variety of sections, such as an "I" section, an "L" section, or a "U" section for example.

In the embodiments described above, the stiffener foot includes a back chamfer at its outboard end for improved peel resistance, but it will be appreciated that the back chamfer may be omitted.

The stiffener reinforced panel assembly in accordance with this invention is formed by bonding the stiffener foot to the panel, attaching the fitting to the stiffener web and attaching the fitting to the panel outboard of the end of the stiffener foot. The fitting may have pre-drilled pilot holes for fastening the fitting foot. Typically the fitting is fastened to the panel by co-drilling holes in the fitting foot and, co-drilling holes in the fitting web and the stiffener web, prior to insertion of the respective fasteners.

FIG. 6 illustrates another alternative embodiment and shows a panel assembly 210 including a panel 211, a stiffener 212 and a fitting 213. The panel assembly 210 is similar in many respects to the panel assemblies 10 and 110 described above and only the differences between the panel assembly 210 and the panel assemblies 10 and 110 will be described in the following.

The stiffener 212 has a web 212b and a foot 212a, wherein the web 212b does not overhang the outboard tip end of the foot 212a. The stiffener 212 and the fitting 213 have been weight optimized. As shown in FIG. 6, the stiffener web 212b has a variable web height and includes a first region I having a "nominal" web height, an intermediate region II having an increased web height, a third region III having a taper of decreasing web height towards the stiffener termination in the run-out region, and a fourth region IV adjacent the fitting 213 having a stiffener web height greater than the height in region III.

The panel assembly 210 illustrated in FIG. 6 also shows how the stiffener 212 navigates through a transverse rib 230 (shown substantially cut away) having a cut-out 231 for receiving the stiffener web 212b. As can also be seen from FIG. 6, the stiffener foot 212 has a nominal width (in regions I and II) but has a region of increased width adjacent regions III and IV to provide a widened stiffener foot "pad" 240 towards the stiffener termination. The stiffener foot 212a, including the pad region 240, is bonded to the panel 211 in the same way as mentioned previously.

FIG. 7 illustrates the fitting 213 in greater detail. The fitting 213 is fastened to the stiffener web 212b (at region IV) by fasteners 220 generally indicated by the fastener locations. The fitting 213 is also fastened to the panel 211 by fasteners 221, again indicated by the fastener locations. In these respects, the panel assembly 210 is similar to the panel assemblies 10 and 110 described previously.

The fitting 213 has several detailed features which will now be described. It will be appreciated that the fitting 213 is also suitable for attachment to the more simplistic design of the stiffener 112 described previously with reference to FIG. 5 and may also be used in conjunction with the overhanging stiffener 12 described with reference to FIGS. 1 to 4.

By contrast with the fittings 13 and 113 described previously, the fitting 213 is unitary and incorporates fingerplates 250 which extend over the stiffener foot 212a adjacent the stiffener termination. The fingerplates are fastened through the stiffener foot 212a to the panel 211 by fasteners 222 generally indicated by the fastener locations. Additionally, or alternatively, the fingerplates 250 may be bonded or otherwise attached to the stiffener foot 212a. The fingerplates 250 preferably extend the full width of the stiffener foot 212a at the stiffener tip (termination) but alternatively may extend across only part of the width of the stiffener tip.

The fingerplates 250 have a lateral edge which extends generally parallel with the stiffener longitudinal axis. However, alternatively, the lateral edges of the fingerplates 250 may conform to the width of the stiffener foot 212a in the region of the pad 240. As can be seen from FIG. 7, the lateral edges of the fingerplates 250 have an upstanding flange 251. The upstanding flanges 251 provide improved stiffness for the fitting 213 as a whole in this weight optimized solution. The upstanding flanges 251 extend generally parallel with the stiffener longitudinal axis.

The tip (termination) of the stiffener foot 212a at the run-out is preferably straight cut transverse to the stiffener longitudinal direction. By contrast with the embodiments described above with reference to FIGS. 1 to 5, there may be no appreciable gap, or only a clearance gap, between the tip end of the stiffener foot 212a and the foot 213a of the fitting. The fitting foot 213a is generally D shaped with a convex profile 252 facing outboard of the stiffener termination in plan view. The generally D shaped fitting foot 213*a* forward of the stiffener termination includes a plurality of cutaway steps 253 for weight-saving purposes. These steps 253 reveal lands which provide surfaces for the fasteners 221 for attaching the fitting 213 to the panel 211 outboard of the stiffener termination.

The fitting 213 also includes a pair of upstanding fitting webs 213*b* which sandwich either side of the stiffener web 212*b*. Both the stiffener web 212*b* and the fitting webs 213*b* have a taper of reducing height towards the stiffener termination. In side view, the profile of the upstanding fitting webs 213*b* substantially correspond to the profile of the stiffener web 212*b* in region IV. As mentioned above, the fitting web 213*b* is fastened to the stiffener web 212*b* by fasteners 220.

Whilst in the embodiment described above with reference to FIGS. 6 and 7 the fitting 213 has a unitary construction, it will be appreciated that the fitting may be formed as two discrete components for fastening to the stiffener foot, the panel and to the stiffener web on either side of the stiffener web. Whether a one-part or two-part fitting is used in the panel assembly 210, the fitting preferably comprises the same metallic materials as for the fittings 13 and 113 described previously.

Although the invention has been described above with reference to one or more preferred embodiments, it will be appreciated that various changes or modifications may be made without departing from the scope of the invention as defined in the appended claims.

The invention claimed is:

1. An aircraft panel assembly comprising:
   a skin panel of an aircraft wing box;
   a span-wise reinforcing stringer having a foot, an upstanding web and a run-out region at an end of the foot; and
   wherein the foot of the stringer is bonded to the skin panel, and
   a fitting is attached to the upstanding web of the stringer and the fitting makes contact with the skin panel at a location outboard of the end of the foot of the stringer, wherein the skin panel is continuous at least from the foot of the stringer to and past the fitting.

2. The aircraft panel assembly according to claim 1, wherein an outboard end of the upstanding web overhangs an outboard end of the foot in the run-out region.

3. The aircraft panel assembly according to claim 2, wherein the fitting is attached to at least the overhanging part of the upstanding web.

4. The aircraft panel assembly according to claim 1, wherein the fitting is fastened to the upstanding web and/or to the panel.

5. The aircraft panel assembly according to claim 4, wherein the fitting is fastened directly to the upstanding web and/or to the panel.

6. The aircraft panel assembly according to claim 1, wherein the fitting is not bonded to the panel.

7. The aircraft panel assembly according to claim 1, wherein the fitting is arranged to provide a gap between the end of the foot and the fitting.

8. The aircraft panel assembly according to claim 1, wherein the fitting is formed in two parts, one part being attached on either side of the upstanding web.

9. The aircraft panel assembly according to claim 1, wherein the fitting is formed as a unitary part.

10. The aircraft panel assembly according to claim 1, wherein the foot is bonded to the panel by a bonding selected from the group comprising: co-curing, co-bonding, and secondary bonding.

11. The aircraft panel assembly according to claim 1, wherein the fitting has sufficient bending stiffness to prevent bending of the panel local to the end of the foot.

12. The aircraft panel assembly according to claim 1, wherein the end of the foot has a back chamfer.

13. A panel assembly comprising:
   a panel;
   a stiffener having a foot, an upstanding web and a run-out region at an end of the stiffener, wherein the end of the foot has a back chamfer;
   a fitting, and
   a resin fillet between the back chamfer and the panel;
   wherein the foot of the stiffener is bonded to the panel, and
   wherein the fitting is attached to the upstanding web and to the panel outboard of the end of the stiffener.

14. The aircraft panel assembly according to claim 1, wherein the stringer has a T-shaped cross-section.

15. The aircraft panel assembly according to claim 1, including a fillet at the intersection between the upstanding web and the end of the foot.

16. The aircraft panel assembly according to claim 1, wherein the fitting includes a finger plate extending over a portion of the foot.

17. The aircraft panel assembly according to claim 16, wherein the finger plate has an upstanding flange.

18. The aircraft panel assembly according to claim 16, wherein the finger plate is fastened through the foot to the panel.

19. A method of forming a stringer reinforced skin panel in an aircraft, the method comprising:
   providing a stringer having a foot, an upstanding web and a run-out region at an end of the stringer,
   bonding the foot to a skin panel, and
   attaching a fitting to the upstanding web, and the fitting making contact with the skin panel at a location outboard of the end of the stringer,
   wherein the skin panel is continuous at least from the foot of the stringer to and past the fitting.

20. The method according to claim 19, wherein the fitting is fastened to the upstanding web and/or to the skin panel.

21. A kit of parts for forming a stringer reinforced skin panel for an aircraft, the kit comprising:
   a stringer having a foot, an upstanding web and a run-out region at an end of the stringer;
   a skin panel configured to be bonded to at least the end of the stringer; and
   a fitting configured to attach to the upstanding web, and the fitting making contact with the skin panel at a location outboard of the end of the foot of the stringer,
   wherein the skin panel is further configured to be continuous at least from the foot of the stringer to and past the fitting.

22. The aircraft panel assembly according to claim 1, wherein the span-wise reinforcing stringer extends longitudinally across the aircraft wing box.

23. The method according to claim 19, wherein the stringer is a longitudinal stringer.

24. The kit of parts according to claim 21, wherein the stringer is a longitudinal stringer.

\* \* \* \* \*